United States Patent Office 3,479,589
Patented Nov. 18, 1969

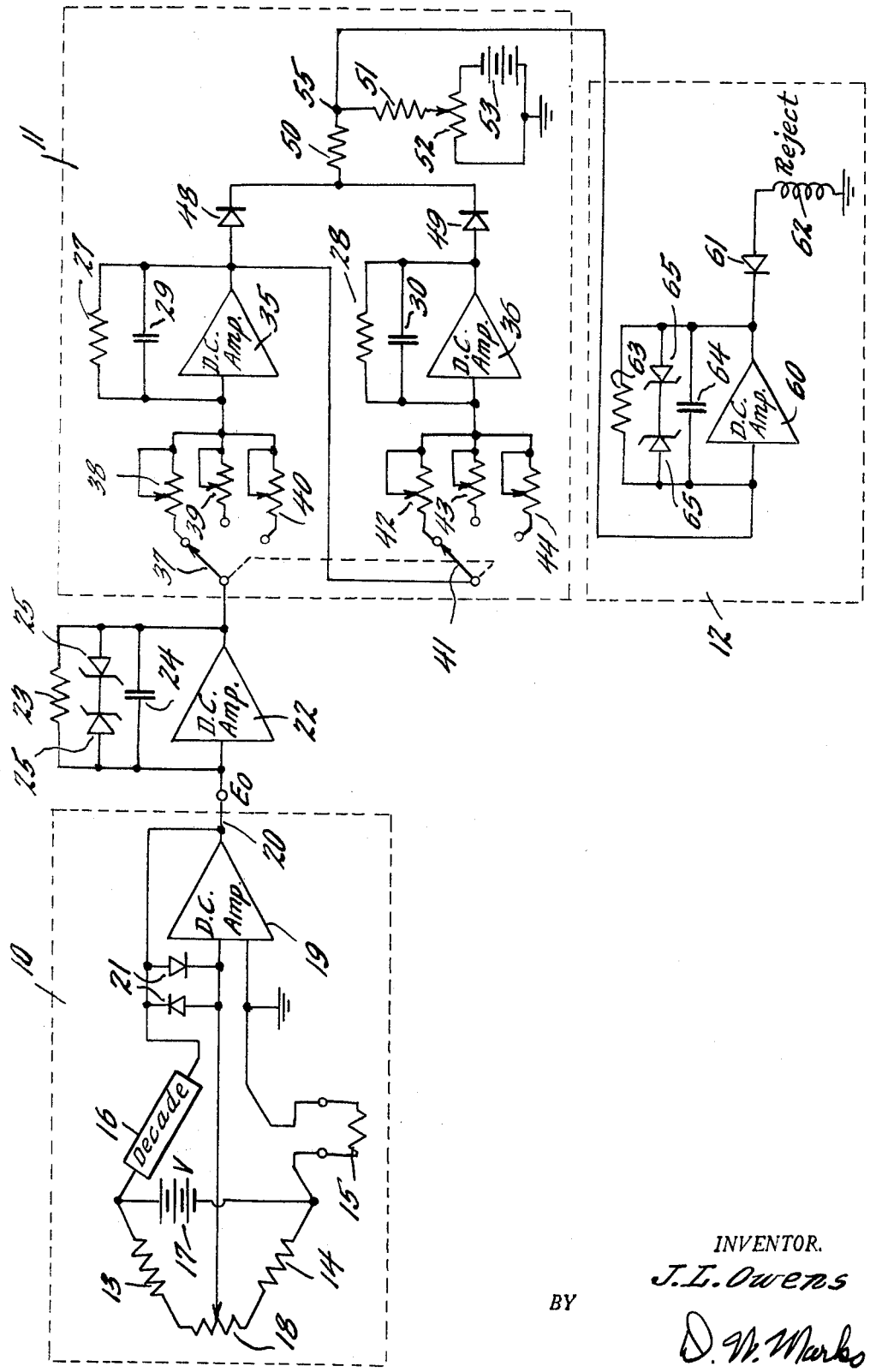

3,479,589
RESISTANCE MEASURING BRIDGE CIRCUIT HAVING OUTPUT MEANS PROVIDING A SINGLE POLARITY VOLTAGE
James Loyd Owens, Clemmons, N.C., assignor to Western Electric Company, Incorporated, New York, N.Y., a corporation of New York
Filed Feb. 21, 1967, Ser. No. 617,594
Int. Cl. G01r 27/02
U.S. Cl. 324—62        3 Claims

ABSTRACT OF THE DISCLOSURE

A bridge circuit for sensing a resistance that is greater or less than a standard resistance by more than a predetermined amount. Unidirectional conducting circuitry connected to the outputs of two serially connected D.C. inverter amplifiers which are connected to the bridge output produces a single polarity voltage having a magnitude proportional to the deviation of the unknown resistance from the known resistance. Circuitry responsive to the single polarity voltage indicates whether the unknown resistance comes within the predetermined tolerance.

BACKGROUND OF THE INVENTION

In the manufacture of resistors, the resistances of the resistors are tested to determine whether the resistances differ more than a predetermined percent from a standard resistance. Resistors having resistances which are not within the predetermined percent are automatically rejected from the manufacturing line. For making this test, it is desirable to use a direct current bridge circuit with the resistance under test and the standard resistance connected in respective arms because of the inherent precision of the direct current bridge. Since the output voltage of the bridge may be either a negative or a positive voltage depending upon whether the resistance under test is greater or less than the standard resistance, it is necessary to have circuitry responsive to both negative and positive voltages to operate the automatic rejector control circuitry. In the prior art a relay switching circuit was used to reverse the polarity of the bridge output when the polarity was wrong for the rejection control circuit. The relay contacts sometimes failed or introduced resistance into the circuit which caused an erroneous reading.

An object of the present invention is a new and improved circuit for sensing a resistance that varies more than a predetermined amount from a standard resistance.

SUMMARY OF THE INVENTION

The present invention contemplates a circuit utilizing a direct current bridge for determining when a resistance under test differs from a standard resistance by more than a predetermined amount. The resistance under test and the standard resistance are connected in respective arms of the bridge and a gating circuit is connected to the output of the bridge to convert the output voltage of the bridge which may be either a positive or a negative voltage to a voltage of a single polarity having a magnitude proportional to the difference between the resistance under test and the standard resistance. That single polarity voltage is sensed to indicate the acceptance or rejection of the resistance.

DESCRIPTION OF AN EMBODIMENT

Referring to the accompanying circuit drawing of an embodiment of the invention, there is shown a bridge 10, a gating circuit 11, and an automatic rejector control circuit 12. The output of the bridge circuit 10 may be either a positive or negative voltage having a magnitude proportional to the amount or percentage difference between a resistance under test and a standard resistance. The gating circuit 11 converts the output of the bridge to a voltage of a single polarity having a magnitude proportional to the percentage difference. The rejection control circuit 12 is responsive to a predetermined voltage to cause the rejection of an inferior resistor.

The bridge circuit 10 includes matched resistors 13 and 14, a resistor-under-test 15, and a standard decade resistor 16 in respective first, second, third and fourth arms of the bridge. A voltage source 17 is connected between the junction of the resistors 13 and 16 and the junction of the resistors 14 and 15. The resistors 13 and 14 are joined by a potentiometer 18 which has a variable contact connected to one input of a high-gain chopper-stabilized operational D.C. inverter amplifier 19. One end of the resistor-under-test 15 is connected to the other input of the amplifier 19 which is connected to ground. The output 20 of the amplifier 19 is connected to one end of the standard resistor 16. Diodes 21 connect the output 20 of the bridge to the variable contact of the potentiometer 18 to prevent the overloading of the testing circuit.

Assuming that the resistance of the diodes 21 is very high within the voltage range on the output 20, the input of the D.C. amplifier 19 has a very high impedance and the gain of the D.C. amplifier 19 is much greater than 1; then the output voltage of the bridge 10 is given by the following relationship:

$$E_0 = \frac{Vx(R_s - R_x)}{2R_x}$$

Where $E_0$ is the output voltage of the bridge 10 with respect to ground, V is the voltage of the source 17, $R_s$ is is the value of the resistance 16, and $R_x$ is the value of the resistor-under-test 15. The output voltage $E_0$ of the bridge 10 has a magnitude which is proportional to the percentage deviation of the standard resistor 16 from the resistor-under-test 15. If the position of the standard resistor 16 and the resistor-under-test 15 were interchanged, then the output voltage $E_0$ of the bridge 10 would be proportional to the percentage deviation of the resistor-under-test 15 from the standard resistor 16. The former percentage is nearly equal to the latter percentage. The former circuit arrangement has the advantage that the amplifier 19 does not change to open circuit gain when a resistor-under-test is not connected in the circuit. Also, the former arrangement has one terminal of the resistor-under-test connected to ground to simplify the connection to resistors in the manufacturing line.

The output 20 of the bridge circuit is connected to a high-gain chopper-stabilized operational D.C. inverter amplifier 22 having a minimum D.C. drift and zero offset. A feedback resistor 23 connected between the output and input of the amplifier 22 has a value such that the input voltage of the amplifier 22 is sufficiently amplified to operate the gating circuit 11 and the rejector control circuit 12. A capacitor 24 and Zener diodes 25 prevent oscillation and overloading of the amplifier 22.

A first range selector switch 37 in the gating circuit 11 connects the output of the amplifier 22 to a respective one of the variable resistors 38, 39, and 40 which are connected to the input of an operational D.C. inverter amplifier 35. The output of the amplifier 35 is connected by a second range selector switch 41 to a respective one of the variable resistors 42, 43, and 44 which are connected to the input of an operational D.C. inverter amplifier 36. Feedback resistors 27 and 28, connected between the outputs of the amplifiers 35 and 36, have values such that the amplifiers have nearly unity gain. Capacitors 29 and 30 connected between the outputs and inputs of the amplifiers 35 and 36 prevent oscillation of the amplifiers.

The outputs of the amplifiers 35 and 36 are connected by respective gating diodes 48 and 49 and a resistor 50 to the summing point 55. The resistor 51 is connected between the summing point 55 and a movable contact of a potentiometer 52 which is connected across a negative voltage source 53.

The output of the D.C. amplifier 36 is the inverse or of the opposite polarity of the output of the amplifier 35. When the output of the bridge 10 is a positive voltage, the amplifier 35 produces a positive output which passes through diode 48 and resistor 50 to the summing point 55. When the output of the bridge 10 is a negative voltage, the output of the amplifier 36 is positive which passes through diode 49 and the resistor 50 to the summing point 55.

The summing point 55 of the gating circuit 11 is connected to the input of a high-gain chopper-stabilized operational D.C. amplifier 60 having a minimum D.C. drift. The output of the D.C. amplifier 60 is connected by a diode 61 to a reject relay 62. A feedback resistor 63 connected between the output and the input of the amplifier 60, has a value such that the input voltage is sufficiently amplified to operate the relay 62. A capacitor 64 and Zener diodes 65 prevent oscillation and overloading of the amplifier 60.

Initially, the resistor-under-test receiving terminals of the bridge 10 are connected to a resistance 15 which is smaller than the standard resistance 16 by a first predetermined percent to produce a positive output voltage on the amplifier 19. The range selector switches 37 and 41 are connected to respective variable resistors 38 and 42. The potentiometer 52 is adjusted to produce a predetermined negative voltage on the summation point 55 in the absence of output voltages from the amplifiers 35 and 36. Then the potentiometer 38 is adjusted to produce a positive output voltage on the amplifier 35, a positive voltage on the summation point 55, and a voltage on the output of amplifier 60 which is equal to the operating voltage of the relay 62.

Next, the resistance 15 is changed so that it is larger than the standard resistance 16 by the first predetermined percent to produce a negative output voltage on the amplifier 19. Then the potentiometer 42 is adjusted to produce a positive output voltage on the amplifier 36, a positive voltage on the summation point 55, and an output voltage on amplifier 60, which is equal to the operating voltage of the relay 62. The circuit is now ready to sense a resistor-under-test 15 which is greater or less than the standard resistance 16 by more than the first predetermined percent.

The test circuit may be made capable of sensing a resistor-under-test 15 which is greater or less than the standard resistance 16 by more than a second predetermined percent by connecting the switches 37 and 41 to the potentiometers 39 and 43 and then: (1) inserting a resistance 15 which is less than the standard resistance 16 by the second predetermined percent, and adjusting the potentiometer 39 to produce the critical relay operating voltage on amplifier 60; and (2) inserting a resistance 15 which is greater than the standard resistance 16 by the second predetermined percent and adjusting the potentiometer 43 to produce the critical relay operating voltage on amplifier 60. In a similar manner the potentiometers 40 and 44 may be adjusted to make the circuit capable of sensing a resistor-under-test 15 which is greater or less than the standard resistance 16 by more than a third predetermined percent.

What is claimed is:
1. A circuit for sensing an unknown resistance that is greater or less than a standard resistance by more than a predetermined variation comprising:
   a D.C. Wheatstone bridge circuit having the unknown resistance and the standard resistance in respective arms thereof and which produces a positive or a negative output voltage depending upon whether the unknown resistance is greater or less than the standard resistance;
   a pair of serially connected D.C. inverter amplifiers connected to the output of the bridge circuit;
   unidirectional conducting means connected to the outputs of both amplifiers to convert the output voltage of the bridge into a voltage of a single polarity; and
   means responsive to the single polarity voltage of the unidirectional conducting means for indicating when the single polarity voltage exceeds a predetermined level.

2. A resistance tolerance testing circuit comprising:
   (a) a bridge circuit including:
      a D.C. inverter amplifier;
      a first, a second, a third, and a fourth resistance serially connected, in the named order, between a first input terminal and an output terminal of the amplifier;
      a voltage source connected between the junction of the first and second resistances and the junction of the third and fourth resistances; and
      means connecting the junction of the second and third resistances to a second input terminal of the amplifier; whereby a negative or positive voltage is produced on the output terminal of the amplifier with respect to the first input terminal of the amplifier depending upon whether the first resistance is greater or less than the fourth resistance;
   (b) a gating circuit connected to the output of the bridge circuit for converting the output voltage of the bridge circuit into a voltage of a single polarity which has a magnitude proportional to the percentage variation of the unknown resistance from the standard resistance; and
   (c) means responsive to the single polarity voltage of the gating circuit for indicating when the single polarity voltage exceeds a predetermined voltage.

3. A circuit as defined in claim 2, wherein the gating circuit includes:
   a pair of serially connected D.C. inverter amplifiers; and
   unidirectional conducting means connecting the outputs of the pair of amplifiers to the indicating means whereby the output voltage of the bridge is converted into a voltage of a single polarity.

References Cited

UNITED STATES PATENTS

| | | | |
|---|---|---|---|
| 2,946,950 | 7/1960 | Zomber | 324—57 |
| 3,379,973 | 4/1968 | Walton | 324—62 |

EDWARD E. KUBASIEWICZ, Primary Examiner